United States Patent [19]
Lin

[11] Patent Number: 5,657,890
[45] Date of Patent: Aug. 19, 1997

[54] STOPPER ASSEMBLY FOR A MOLD OPENING

[76] Inventor: Ying-Feng Lin, No. 25, Lane 50, Sec. 3, Chung-Hsiao Rd., Sanchung City, Taipei County, Taiwan

[21] Appl. No.: 548,953

[22] Filed: Oct. 27, 1995

[51] Int. Cl.$^6$ .............. B29C 33/04; B65D 53/00
[52] U.S. Cl. .............. 220/235; 249/141; 249/79
[58] Field of Search .............. 249/141, 79; 200/235, 200/234

[56] References Cited

U.S. PATENT DOCUMENTS

| | | | |
|---|---|---|---|
| 3,667,640 | 6/1972 | Morrow | 220/235 |
| 3,813,201 | 5/1974 | Frederick et al. | 249/141 |
| 3,822,857 | 7/1974 | Tanie | 249/141 |
| 4,026,512 | 5/1977 | Holt | 249/141 |
| 4,494,670 | 1/1985 | Barone | 220/235 |
| 5,184,698 | 2/1993 | Coffenberry | 220/235 |

*Primary Examiner*—Jay H. Woo
*Assistant Examiner*—Robert Hopkins
*Attorney, Agent, or Firm*—Morton J. Rosenberg; David I. Klein

[57] ABSTRACT

An improved packing means for sealing water holes in molds includes a first and second pressure elements having flanks on both sides and holding therebetween a steel ring. A first and second rubber rings are respectively provided next to the first and second pressure elements. The first rubber ring, the first pressure element, the steel ring, the second pressure element and the second rubber ring are respectively fitted onto a threaded rod portion of a main seat. The packing means further includes a locking seat having an internally threaded rod at one end thereof and an upper end provided with a slot or Phillips head at the other end thereof. The locking seat is locked onto the threaded rod portion of the main seat by means of a slotted or Phillips head screwdriver. Upon tightening, the first and second rubber pressure elements will press against the first and second rubber rings to stretch them outwardly and the steel ring to expand and be positioned in place. The first and second rubber rings may be fitted into the water holes of mold to effectively stop the entrance of water.

1 Claim, 2 Drawing Sheets

STOPPER ASSEMBLY FOR A MOLD OPENING

FIELD OF THE INVENTION (a) Field of the Invention

The present invention relates generally to an improved stopper assembly, or packing means, for molds, and more particularly to a packing means which is simple in construction and may be easily installed on or removed from the molds to effectively seal holes in the molds.

(b) Description of the Prior Art

Conventional plastic molds are provided with a plurality of water holes for cooling purposes. When these water holes are not necessary, they must be stopped by packing means. Conventional packing means are usually very complicated in construction and do not have good sealing effects nor good pressure resistance. It is not easy to install them from the inside of the water holes too. Besides, it is difficult to remove the packing means from the water holes when the holes are needed for cooling purposes, since the rubber parts may adhere to the walls of the holes and cannot be taken down.

SUMMARY OF THE INVENTION

A primary object of the present invention is to provide an improved packing means for sealing water holes in molds which is simple in construction and easy to install on or remove from the molds.

Another object of the present invention is to provide an improved packing means for sealing water holes in molds, in which a first and second rubber rings are provided to stop water in two directions so as to achieve good packing effects.

A further object of the present invention is to provide an improved packing means for sealing water holes in molds, in which a steel ring is provided to position the packing means firmly in place.

Still another object of the present invention is to provide an improved packing means for sealing water holes in molds, in which a first and second pressure elements are provided to provide good pressure resistance to the packing means.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
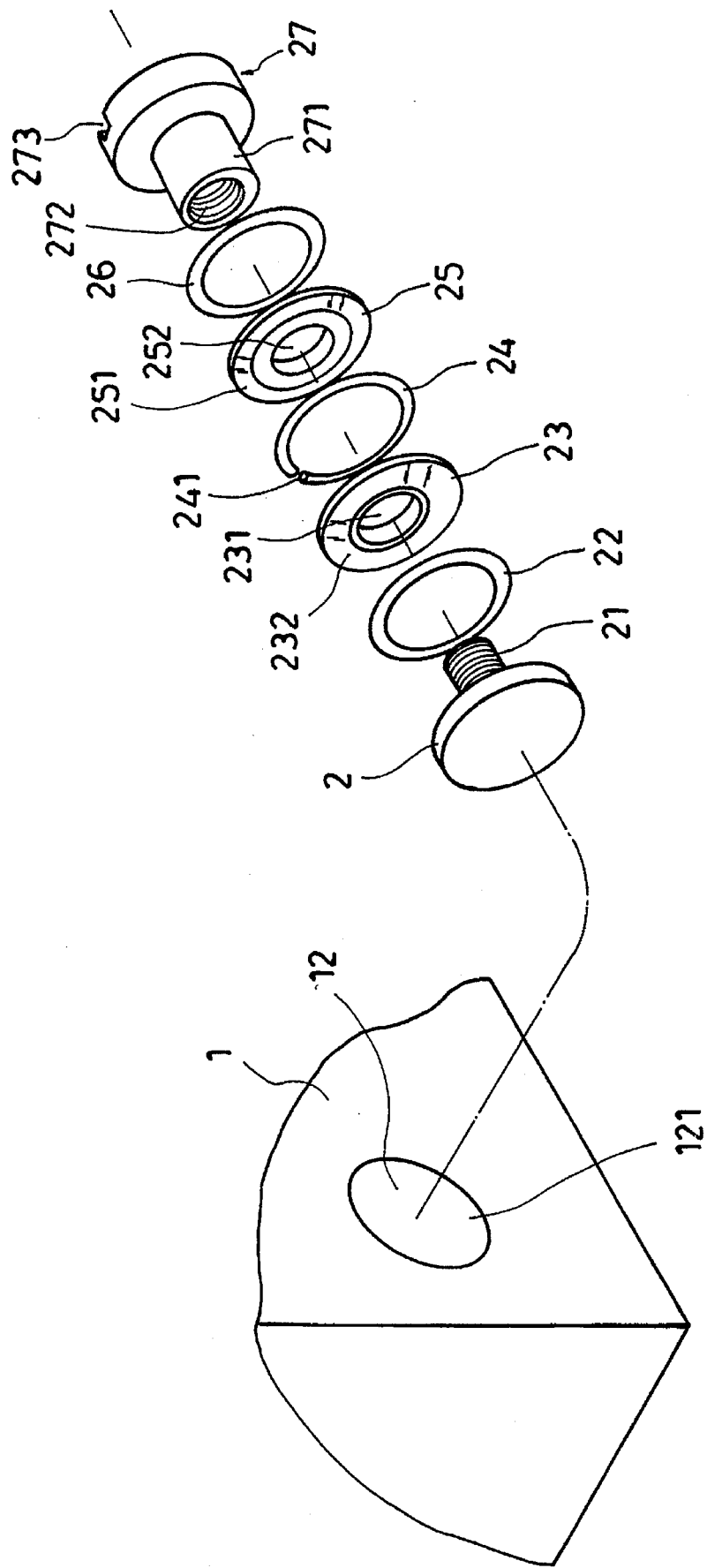
FIG. 1 is a perspective view of the present invention.
Figure 2:
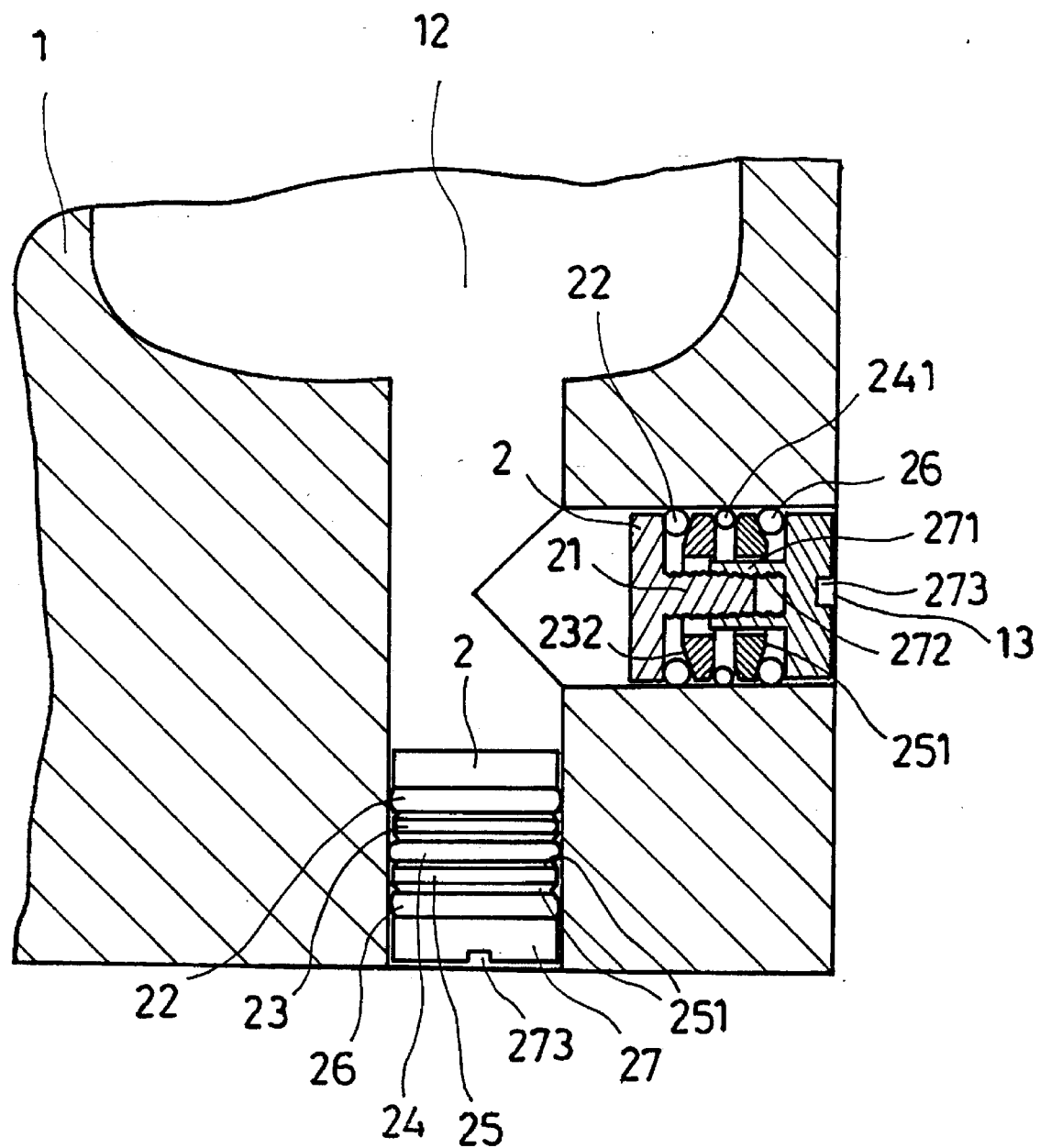
FIG. 2 is a sectional view of the present invention.

With reference to FIGS. 1 and 2, a mold body 1 has a plurality of water holes 12, 13 provided at suitable positions. The packing means according to the present invention essentially comprises a main seat 2, a first rubber ring 22, a first pressure element 23, a steel ring 24, a second pressure element 25, a second rubber ring 26, and a locking seat 27. The main seat 2 is provided with a central threaded rod 21. The first rubber ring 22, the first pressure element 23, the steel ring 24, the second pressure element 25 and the second rubber ring 26 are fitted onto the threaded rod 21 in turn, and the locking seat 27 is lastly screwably fitted onto the threaded rod 21. The first pressure element 23 has a central through hole 231 and is provided with flanks 232 on both sides thereof. The steel ring 24 is provided with a split 241 so that the steel ring 24 is expandable. The second pressure element 25 is also provided with flanks 251 on both sides thereof and has a central through hole 252. Both the first and second pressure elements 23, 25 may be formed of any suitable material known in the prior art of sufficient strength and rigidity to transfer a deforming force to the steel ring 24 and to the rubber rings 22, 26 without itself deforming. The locking seat 27 is provided with a rod portion 271 having internal threads 272. These internal threads 272 match the external threads of the threaded rod 21 of the main seat 2. An upper surface of the locking seat 27 is provided with a Phillips head or a slot 273 so that the locking seat 27 may be easily fastened onto the threaded rod 21 of the main seat by means of a slotted or Phillips head screwdriver. When the locking seat 27 is screwed very tightly onto the main seat 2, the first and second pressure elements 23, 25 having flanks 232, 251 respectively may press against the steel ring 24 as well as the first and second rubber rings 22 and 26 so that they may stretch outwardly and the steel ring 24 may expand and be positioned in place. By means of the above arrangement, the first and second rubber rings 22, 26 may seal the water hole 12 against entrance of water, and the inner wall 121 of the water hole 12 is filled, and thereby reinforced against collapse, by the improved stopper assembly. In order to remove the packing means from the mold body 1, it is only necessary to unscrew the locking seat 27 so that the steel ring 24, the first and second rubber ring 22, 26 may contract inwardly.

Although the present invention has been illustrated and described with reference to the preferred embodiment thereof, it should be understood that it is in no way limited to the details of such embodiment but is capable of numerous modifications within the scope of the appended claims.

What is claimed is:

1. A stopper assembly for releasably sealing a through opening of a mold body comprising:

(a) a main seat member adapted for insert into said mold body through opening, said main seat member having a head portion and a central threaded rod portion projecting axially therefrom;

(b) a locking seat member displaceably coupled to said main seat member, said locking seat member having a head portion and a substantially tubular trunk portion projecting axially therefrom, said trunk portion being threadedly coupled to said central threaded rod portion of said main seat member, said head portion having formed thereon engagement means for engagement by a torque transfer device;

(c) at least a pair of annular pressure transfer members coaxially received on said trunk portion of said locking seat member and thereby captured between said head portions of said main and locking seat members, each of said pressure transfer members having opposing first and second surfaces, said first surface having peripherally formed thereon an annular flank portion tapering radially outward, said second surface having peripherally formed thereon an annular flank portion tapering radially outward;

(d) a split ring member coaxially disposed between said pressure transfer members to engage said first surface flank portions thereof, said split ring member being adapted thereby to resiliently expand radially outward reponsive to the axial displacement of said pressure transfer members one towards the other; and, (e) at least a pair of resilient ring members coaxially disposed respectively adjacent said pressure transfer members, said resilient ring members each engaging said second flank portion of one of said pressure transfer members, said resilient ring members each being adapted thereby to resiliently expand radially outward and bear against the inner wall of said mold body through opening responsive to sufficient relative axial displacement of said locking and main seat members one towards the other.

* * * * *